United States Patent
Miyasato et al.

(10) Patent No.: US 9,361,378 B2
(45) Date of Patent: Jun. 7, 2016

(54) DETERMINING RELIABILITY OF ONLINE POST

(75) Inventors: Tsutomu Miyasato, Nara (JP); Noriaki Kuwahara, Nara (JP); Rieko Kadobayashi, Kizugawa (JP); Naoki Kusakawa, Kyoto (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 62 days.

(21) Appl. No.: 13/820,714

(22) PCT Filed: Jun. 27, 2012

(86) PCT No.: PCT/US2012/044339
§ 371 (c)(1),
(2), (4) Date: Mar. 4, 2013

(87) PCT Pub. No.: WO2014/003735
PCT Pub. Date: Jan. 3, 2014

(65) Prior Publication Data
US 2014/0188910 A1      Jul. 3, 2014

(51) Int. Cl.
*G06F 17/30* (2006.01)
*G06Q 50/00* (2012.01)
*H04L 12/58* (2006.01)

(52) U.S. Cl.
CPC ...... *G06F 17/30864* (2013.01); *G06F 17/3087* (2013.01); *G06Q 50/01* (2013.01); *H04L 51/20* (2013.01); *H04L 51/32* (2013.01)

(58) Field of Classification Search
CPC ............................ H04L 12/5865; H04L 51/20
USPC ......................................................... 707/722
See application file for complete search history.

(56) References Cited

U.S. PATENT DOCUMENTS

| 8,812,029 B1* | 8/2014 | Cao et al. .................... 455/456.3 |
| 2006/0149774 A1* | 7/2006 | Egnor ............................ 707/102 |
| 2008/0209011 A1* | 8/2008 | Stremel et al. ................ 709/219 |
| 2010/0241501 A1 | 9/2010 | Marshall |
| 2010/0250727 A1* | 9/2010 | King et al. .................... 709/224 |
| 2011/0035381 A1 | 2/2011 | Thompson et al. |
| 2011/0238762 A1 | 9/2011 | Soni et al. |

(Continued)

FOREIGN PATENT DOCUMENTS

| JP | 2009217501 A | 9/2009 |
| JP | 2010186371 A | 8/2010 |

(Continued)

OTHER PUBLICATIONS

Article entitled "You Are Where You Tweet: A Content-Based Approach to Geo-locating Twitter Users", by Cheng et al., dated Oct. 30, 2010.*

(Continued)

*Primary Examiner* — Mahesh Dwivedi
(74) *Attorney, Agent, or Firm* — Brundidge & Stanger, P.C.

(57) ABSTRACT

Technologies are generally described for determining a reliability of an online post. In some examples, a method may include identifying from an online post at least one word associated with a place, identifying a location from which the online post was posted, and determining a reliability of the online post based at least in part on the identified word associated with the place and the identified location from which the online post was posted.

14 Claims, 7 Drawing Sheets

(56) References Cited

U.S. PATENT DOCUMENTS

| | | | | |
|---|---|---|---|---|
| 2012/0003989 | A1* | 1/2012 | Gravino | 455/456.1 |
| 2012/0109942 | A1* | 5/2012 | Epshtein et al. | 707/723 |
| 2012/0143963 | A1* | 6/2012 | Kennberg et al. | 709/206 |
| 2012/0158753 | A1 | 6/2012 | He et al. | |
| 2012/0166367 | A1* | 6/2012 | Murdock et al. | 706/12 |
| 2013/0073422 | A1* | 3/2013 | Moore et al. | 705/26.7 |
| 2013/0159276 | A1* | 6/2013 | Nagaralu et al. | 707/708 |
| 2013/0203383 | A1* | 8/2013 | Stopel et al. | 455/411 |
| 2013/0325975 | A1* | 12/2013 | Drews et al. | 709/206 |

FOREIGN PATENT DOCUMENTS

| | | |
|---|---|---|
| JP | 201227850 A | 2/2012 |
| WO | 2012011496 A1 | 1/2012 |

OTHER PUBLICATIONS

Article entitled "Location Cheating: A Security Challenge to Location-based Social Network Services", dated Feb. 21, 2011.*

Wikipedia Entry for the Inverse Square Law dated Jun. 19, 2011.*

Article entitled "Tweets from Justin Bieber's Heart: The Dynamics of the "Location" Field in User Profiles", by Hecht et al., dated May 12, 2011.*

Article entitled "Exploring Millions of Footprints in Location Sharing Services", by Cheng et al., Copyright 2011.*

"Twitter lashes out at Google search changes," accessed at http://web.archive.org/web/20120428203545/http://www.msnbc.msn.com/id/45957051, Accessed on Oct. 8, 2014, pp. 1-2.

Kim, T., et al., "Social Visualization for Micro-Blogging Analysis," In Proceedings of the IEEE Information Visualization Conference, pp. 1-2 (2009).

International Search Report from International Application No. PCT/US12/44339 mailed Jun. 27, 2012.

Hideyuki Fujita, "Twitter mesh data acquisition and visualization system, Proceedings of the Geographic Information Systems" Association [CD-ROM], Japan, the Geographic Information Systems Association, Dec. 31, 2011, vol. 20/2011.

Takeshi Sakaki et al., "Twitter as a Social Sensor—Can Social Sensors Exceed Physical Sensors?—", Journal of the Japanese Society for Artificial Intelligence, Japan, the Japanese Society for Artificial Intelligence, Jan. 1, 2012, vol. 27(1), p. 67-74.

Tatsuya Fujisaka et al., "Estimating influence regions of social events" by geo-tagged micro-blogs analysis, The second forum on data engineering and information management—DEIM 2010—, Japan, IEICE, Jun. 9, 2010, p. 1-5.

Eri Miyamoto, "A development of the system promoting communication with people in destination", IPSJ SIG Technical Report, 2011 [CD-ROM], Japan, IPSJ, Aug. 15, 2011.

* cited by examiner

DETERMINING RELIABILITY OF ONLINE POST

BACKGROUND

Social networking services such as Facebook, Google Plus and Twitter are widely used worldwide. Via the social networking services, people freely post news they have heard, their activities, their ideas and/or opinions, images and/or videos, and/or anything they want to share with others. Among myriads of information people posted, some information is false and thus useless.

SUMMARY

In an example, a method may include identifying from an online post at least one word associated with a place, identifying a location from which the online post was posted, and determining a reliability of the online post based at least in part on the identified word associated with the place and the identified location from which the online post was posted.

In an example, a method may include receiving from a device a search request that includes information regarding a target area, retrieving from a database one or more online posts that were posted within the target area, and presenting the retrieved online posts to the device.

In an example, a method may include receiving from a device a search request that includes a search query, identifying from the search query a target place and a target range of distance from the identified target place, retrieving from a database one or more online posts that include at least one word associated with the identified target place, and were posted within the target range of distance from the identified target place, and presenting the retrieved online posts to the device.

In an example, a method may include monitoring variation in an amount of online posts, and estimating a time and a place of an incident occurrence based at least in part on when and where the online posts were posted when the amount of the online posts posted within a certain area increases suddenly.

In an example, a method may include monitoring variation in an amount of online posts, and triggering an alarm when the amount of the online posts posted within a certain area increases suddenly.

In an example, a computer-readable storage medium may store thereon computer-executable instructions that, in response to execution, cause a server to perform operations including determining a reliability of each of multiple online posts based at least in part on a location from which the corresponding online post was posted, and screening the multiple online posts based at least in part on the determined reliabilities.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
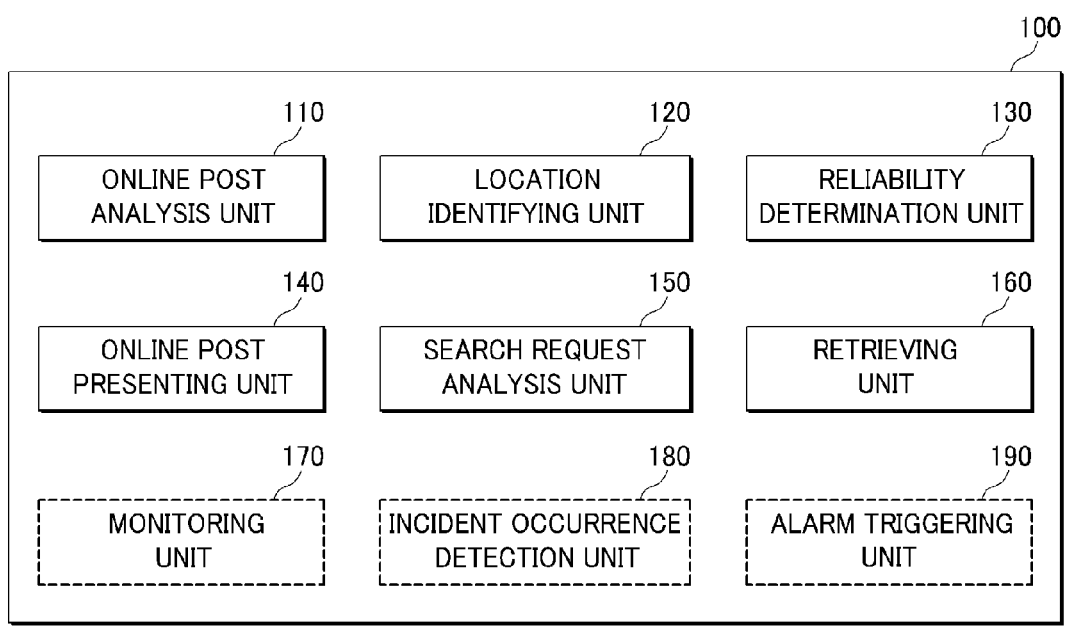
FIG. 1 shows a schematic block diagram illustrating an example architecture of a server, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to an online service such as, for example, a social networking service, which allows users to share ideas, activities, events and interests.

Technologies are generally described for determining a reliability of an online post. In some examples, a server may determine the reliability of the online post based at least in part on a location from which the online post was posted. By way of example, but not limitation, the server may be of a social network service (SNS) provider such as Facebook, Google Plus, Twitter, etc., an electronic bulletin board service provider, a web portal service provider, and so on.

In some examples, the server may identify, from information associated with the online post, at least one word associated with a place, identify the location from which the online post was posted, and determine the reliability of the online post based at least in part on the identified word associated with the place and the identified location from which the online post was posted. By way of example, but not limitation, when a user in Kyoto, Japan posts an online post regarding a nuclear power plant of Fukushima, Japan, the server may identify from the online post the word "Fukushima" and identify the location "Kyoto," and determine the reliability of the online post based at least in part on the word "Fukushima" and the location "Kyoto." The determined reliability may then be used for readers of the online post to discern the trustworthiness of the online post.

In some examples, the server may determine the reliability of the online post based at least in part on a distance between the place associated with the identified word and the identified location. In some examples, the determined reliability of the online post may decrease as the distance between the place associated with the identified word and the identified location increases. By way of example, but not limitation, when a first user in Kyoto posts a first online post regarding the nuclear power plant of Fukushima and a second user in Sendai, Japan posts a second online post regarding the nuclear power plant of Fukushima, the server may determine that a reliability of the second online post is higher than a reliability of the first online post, since a distance between Sendai and Fukushima is shorter than a distance between Kyoto and Fukushima.

In some examples, the server may identify the location from which the online post was posted based at least in part on location information, such as GPS (Global Positioning System) information, of a device via which the online post was posted.

In some examples, the server may block the online post if the determined reliability of the online post is lower than a predetermined value. The server may then present the online post with the identified location from which the online post was posted and/or the determined reliability of the online post.

In some examples, when the server receives, from a device, a search request that includes information regarding a target area, the server may retrieve from a database one or more online posts that were posted within the target area, and present the retrieved online posts to the device. A user may select the target area by drawing a circle, a polygon or a looped curve on a map presented to or displayed on the device that transmitted the search request, and then the server may retrieve and present to the device one or more online posts that were posted within the target area.

In some embodiments, the database, which may be a component of the server or separate from but controlled by the server, may store the one or more online posts.

In some examples, when the server receives, from a device, a search request that includes a search query, the server may identify from the search query a target place and a target range of distance from the identified target place. Then, the server may retrieve from a database one or more online posts that include at least one word associated with the identified target place and that were posted within the target range of distance from the identified target place, and present the retrieved online posts to the device. By way of example, but not limitation, when the search query includes "autumn tints within a distance of about 30 minutes by car from Kyoto station," the server may identify Kyoto station as the target place and the distance of about 30 minutes by car, that is, for example, about 20 to 25 kilometers, as the target range of distance, and retrieve and present to the device one or more online posts posted within the target range of distance from the target place.

In some examples, the server may monitor variation in an amount of online posts. When the amount of the online posts posted within a certain area increases suddenly, the server may estimate a time and a place of an incident occurrence based at least in part on when and where the online posts were posted. In some examples, when the amount of the online posts posted within a certain area increases suddenly, the server may trigger an alarm.

FIG. 1 shows a schematic block diagram illustrating an example architecture of a server, arranged in accordance with at least some embodiments described herein.

As depicted, a server 100 may include an online post analysis unit 110, a location identifying unit 120, a reliability determination unit 130, an online post presenting unit 140, a search request analysis unit 150 and a retrieving unit 160. Although illustrated as discrete components, various components may be divided into additional components, combined into fewer components, or eliminated altogether while being contemplated within the scope of the disclosed subject matter. By way of example, but not limitation, server 100 may be of a social network service (SNS) provider such as Facebook, Google Plus, Twitter, etc., an electronic bulletin board service provider, a web portal service provider, and so on.

Online post analysis unit 110 may be configured to identify from an online post at least one word associated with a place that is referenced in the online post. By way of example, but not limitation, when a user posts an online post regarding a nuclear power plant of Fukushima, online post analysis unit 110 may identify from the online post the word "Fukushima."

Location identifying unit 120 may be configured to identify a location from which the online post was posted. In some embodiments, location identifying unit 120 may identify the location from which the online post was posted based at least in part on location information of a posting device via which the online post was posted. In some embodiments, location identifying unit 120 may identify the location from which the online post was posted based at least in part on metadata associated with the online post. In some embodiments, the location information of the posting device may include GPS (Global Positioning System) information of the posting device when the online post is posted. By way of example, but not limitation, when the user posts an online post via his/her smartphone in Kyoto, the server may identify the location "Kyoto" based at least in part on the GPS information of the smartphone.

Reliability determination unit 130 may be configured to determine a reliability of the online post based at least in part on the word identified by online post analysis unit 110 and the location identified by location identifying unit 120. In some embodiments, reliability determination unit 130 may determine the reliability of the online post based at least in part on a distance between the place associated with the word identified by online post analysis unit 110 and the location identified by location identifying unit 120. The determined reliability of the online post may decrease as the distance between the place associated with the word identified by online post analysis unit 110 and the location identified by location identifying unit 120 increases. By way of example, but not limitation, the reliability may be inversely proportional to the square of the distance, the cube of the distance, any $n^{th}$ power of the distance, and so on. The reliability may be defined as any factor (e.g., a constant) divided by the square of the distance, the cube of the distance, or any $n^{th}$ power of the distance.

Online post presenting unit 140 may be configured to present the online post to multiple devices including the posting device. In some embodiments, online post presenting unit 140 may present the online post with the location identified by location identifying unit 120. In some embodiments, online post presenting unit 140 may present the online post with the reliability of the online post determined by reliability determination unit 130. In some embodiments, online post presenting unit 140 may block the online post if the reliability determined by reliability determination unit 130 is lower than a predetermined value.

Search request analysis unit 150 may be configured to analyze a search request from a requesting device. In some embodiments, search request analysis unit 150 may identify a target area in the search request. By way of example, but not limitation, a user of the requesting device may select the target area by drawing a circle, a polygon or a looped curve on a map presented to or displayed on the requesting device, and then search request analysis unit 150 may identify the area selected by the user as the target area, as will be described in more detail with reference to FIG. 2.

Figure 2:
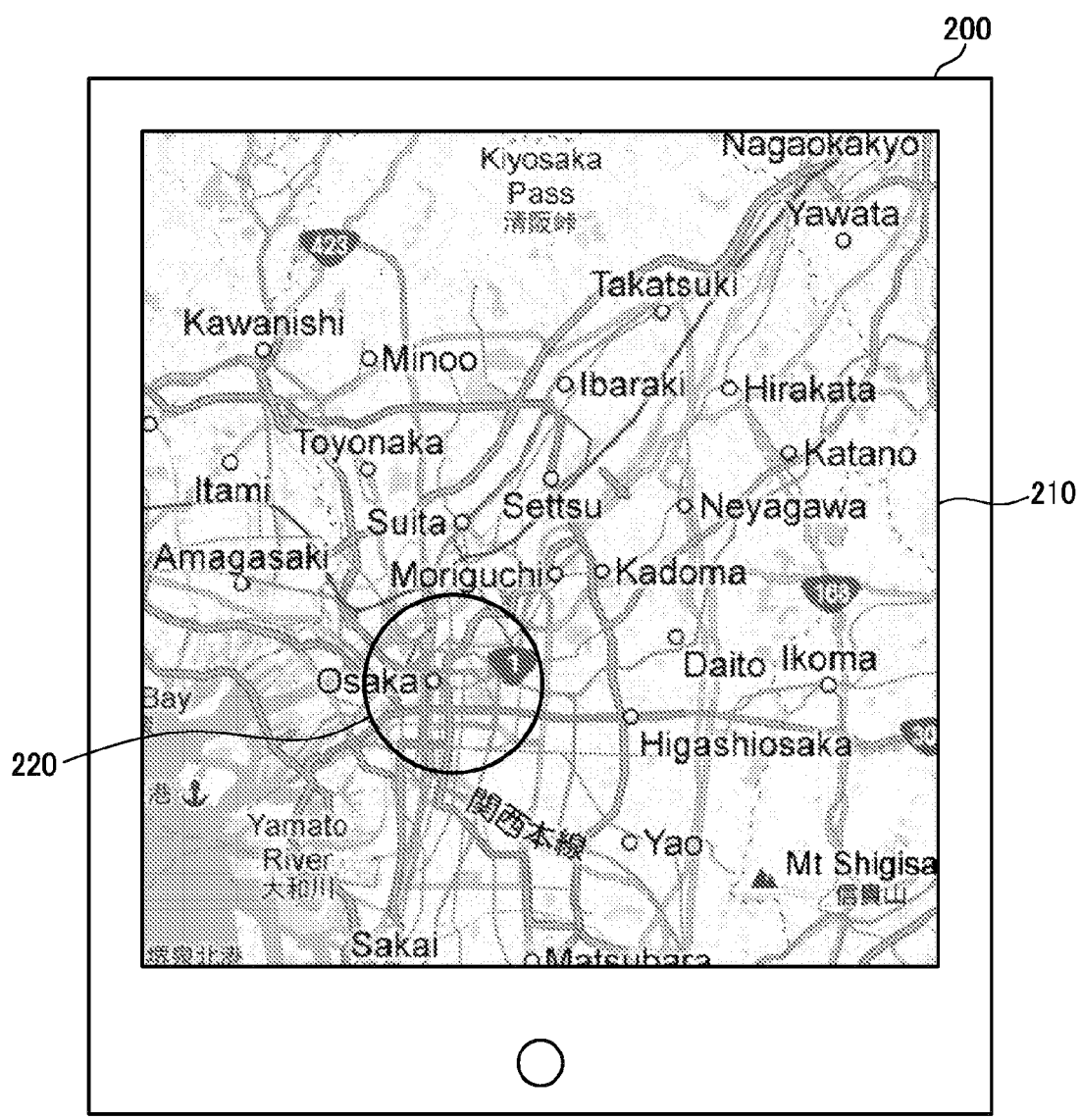
FIG. 2 schematically shows an illustrative example of a device configured to receive from a user information regarding a target area and transmit to a server a search request with the information regarding the target area, arranged in accordance with at least some embodiments described herein.

FIG. 2 schematically shows an illustrative example of a device configured to receive from a user information regarding a target area and transmit to a server a search request with the information regarding the target area, arranged in accordance with at least some embodiments described herein.

As depicted in FIG. 2, a device 200 may display a map 210 thereon. Then, a user of device 200 may select a target area by drawing, for example, a circle 220 on map 210. Server 100 may then receive from device 200 a search request with information on an area defined by circle 220 drawn on map 210, and identify the area selected by the user as the target area. Examples of device 200 may include, but are not limited to, a tablet, a smartphone, a mobile phone, a personal digital assistant (PDA), a mobile game console, a laptop computer, a desktop computer, or any other devices being able to access server 100.

Referring to FIG. 1 again, in some alternative embodiments, search request analysis unit 150 may identify from a search query, which may be included in the search request, a target place and/or a target range of distance from the target place. By way of example, but not limitation, when the search query includes "autumn tints within a distance of about 30 minutes by car from Kyoto station," search request analysis unit 150 may identify Kyoto station as the target place and the distance of about 30 minutes by car as the target range of distance.

Retrieving unit 160 may be configured to retrieve from a database (not shown in FIG. 1) one or more online posts based at least in part on the search request analyzed by search request analysis unit 150. In some embodiments, the database, which may be a component of server 100 or separate from server 100 but controlled by server 100, may store the one or more online posts with location information regarding where the respective online posts were posted, which may be identified by location identifying unit 120.

In some embodiments, retrieving unit 160 may retrieve from the database the one or more online posts that were posted within the target area identified by search request analysis unit 150. In some alternative embodiments, retrieving unit 160 may retrieve from the database the one or more online posts that include at least one word associated with the target place identified by search request analysis unit 150, and were posted within the target range of distance identified by search request analysis unit 150 from the target place.

In some embodiments, online post presenting unit 140 may present to the requesting device the online posts retrieved by retrieving unit 160. In some embodiments, online post presenting unit 140 may present to the requesting device the online posts in order of their reliabilities determined by reliability determination unit 130. In some embodiments, online post presenting unit 140 may not present to the requesting device some of the online posts having reliabilities that are determined to be lower than a predetermined value.

In some embodiments, optionally, server 100 may further include a monitoring unit 170, an incident occurrence detection unit 180 and/or an alarm triggering unit 190. Monitoring unit 170 may be configured to monitor variation in an amount of online posts. Incident occurrence detection unit 180 may be configured to estimate a time and a place of an incident occurrence based at least in part on when and where the online posts are posted, when the amount of the online posts posted within a certain area increases suddenly. Alarm triggering unit 190 may be configured to trigger an alarm when the amount of the online posts posted within a certain area increases suddenly.

Figure 3:
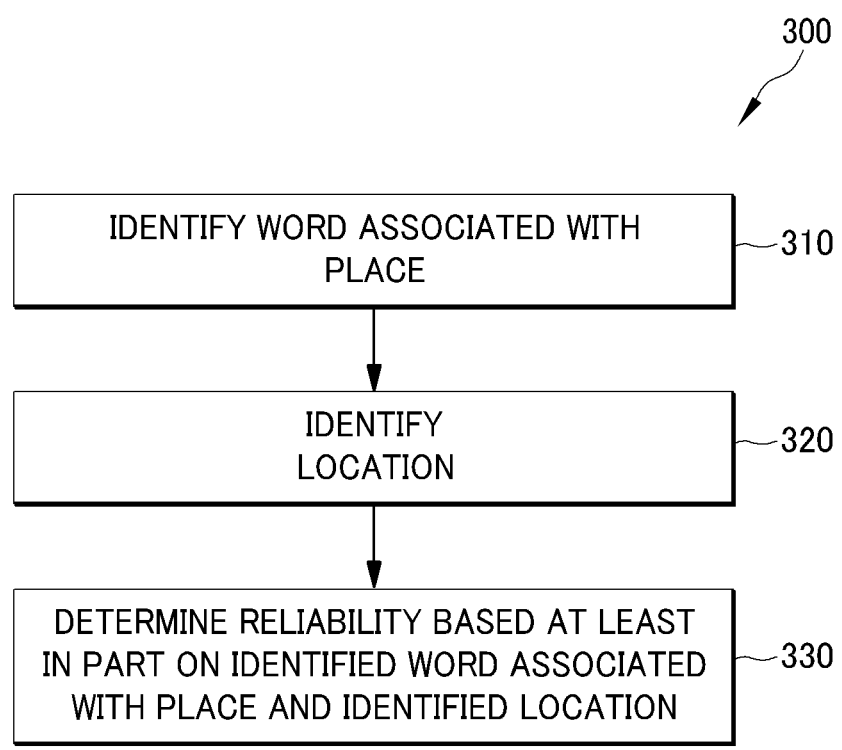
FIG. 3 shows an example flow diagram of a process for determining a reliability of an online post based at least in part on location information, arranged in accordance with at least some embodiments described herein.

FIG. 3 shows an example flow diagram of a process for determining a reliability of an online post based at least in part on location information, arranged in accordance with at least some embodiments described herein.

The process in FIG. 3 may be implemented in a server, such as server 100 including online post analysis unit 110, location identifying unit 120, reliability determination unit 130, online post presenting unit 140, search request analysis unit 150 and retrieving unit 160 described above. An example process 300 may include one or more operations, actions, or functions as illustrated by one or more blocks 310, 320 and/or 330. Although illustrated as discrete blocks, various blocks may be divided into additional blocks, combined into fewer blocks, or eliminated, depending on the desired implementation. Processing may begin at block 310.

At block 310 (Identify Word Associated with Place), server 100 may identify from an online post at least one word associated with a place. Processing may continue from block 310 to block 320.

At block 320 (Identify Location), server 100 may identify a location from which the online post was posted. In some embodiments, server 100 may identify the location based at least in part on location information such as, for example, GPS (Global Positioning System) information of a device via which the online post was posted. Processing may continue from block 320 to block 330.

At block 330 (Determine Reliability based at least in part on Identified Word Associated with Place and Identified Location), server 100 may determine a reliability of the online post based at least in part on the identified word associated with the place and the identified location from which the online post was posted. In some embodiments, the server may determine the reliability based at least in part on a distance between the place associated with the identified word and the identified location. In some embodiments, the determined reliability of the online post may decrease as the distance between the place associated with the identified word and the identified location increases. By way of example, but not limitation, the reliability may be inversely proportional to the square of the distance, the cube of the distance, any $n^{th}$ power of the distance, and so on. The reliability may be defined as a numerical value by dividing a factor (e.g., a constant) into the square of the distance, the cube of the distance, or any $n^{th}$ power of the distance.

Figure 4:
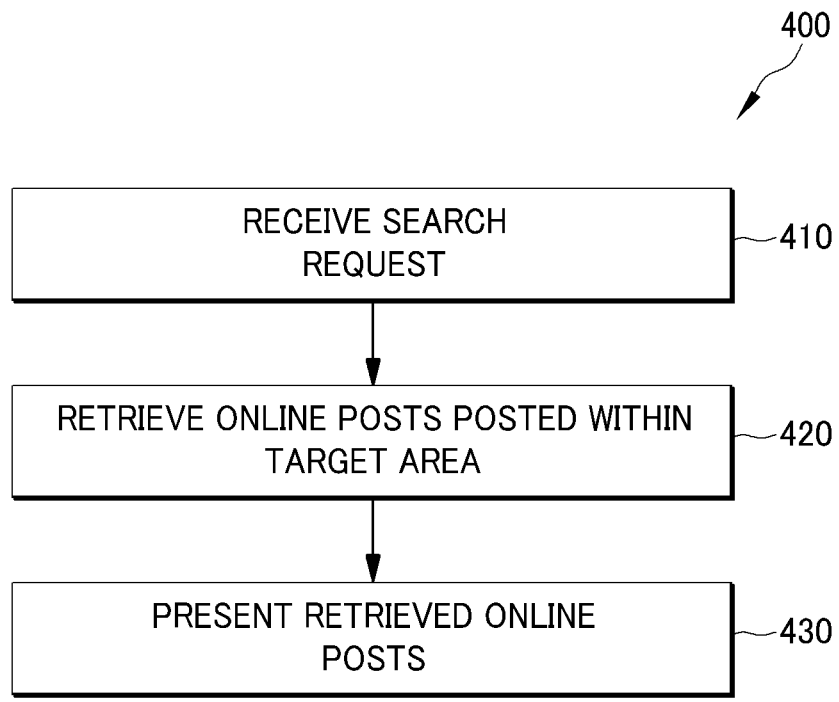
FIG. 4 shows an example flow diagram of a process for providing a search result in response to a search request for one or more online posts, arranged in accordance with at least some embodiments described herein.

FIG. 4 shows an example flow diagram of a process for providing a search result in response to a search request for one or more online posts, arranged in accordance with at least some embodiments described herein.

The process in FIG. 4 may be implemented in a server, such as server 100 including online post analysis unit 110, location identifying unit 120, reliability determination unit 130, online post presenting unit 140, search request analysis unit 150 and retrieving unit 160 described above. An example process 400 may include one or more operations, actions, or functions as illustrated by one or more blocks 410, 420 and/or 430. Although illustrated as discrete blocks, various blocks may be divided into additional blocks, combined into fewer blocks, or eliminated, depending on the desired implementation. Processing may begin at block 410.

At block 410 (Receive Search Request), server 100 may receive a search request from a device. In some embodiments, the search request may include information regarding a target area. Processing may continue from block 410 to block 420.

At block 420 (Retrieve Online Posts Posted within Target Area), server 100 may retrieve from a database one or more online posts that were posted within the target area. In some embodiments, the database may store the one or more online posts with location information regarding where the respective online posts were posted. Processing may continue from block 420 to block 430.

At block 430 (Present Retrieved Online Posts), server 100 may present the retrieved online posts as a search result. In some embodiments, the server may present the online posts in order of their reliabilities. In some embodiments, the server may filter out some of the online posts whose reliabilities are lower than a predetermined value.

Figure 5:
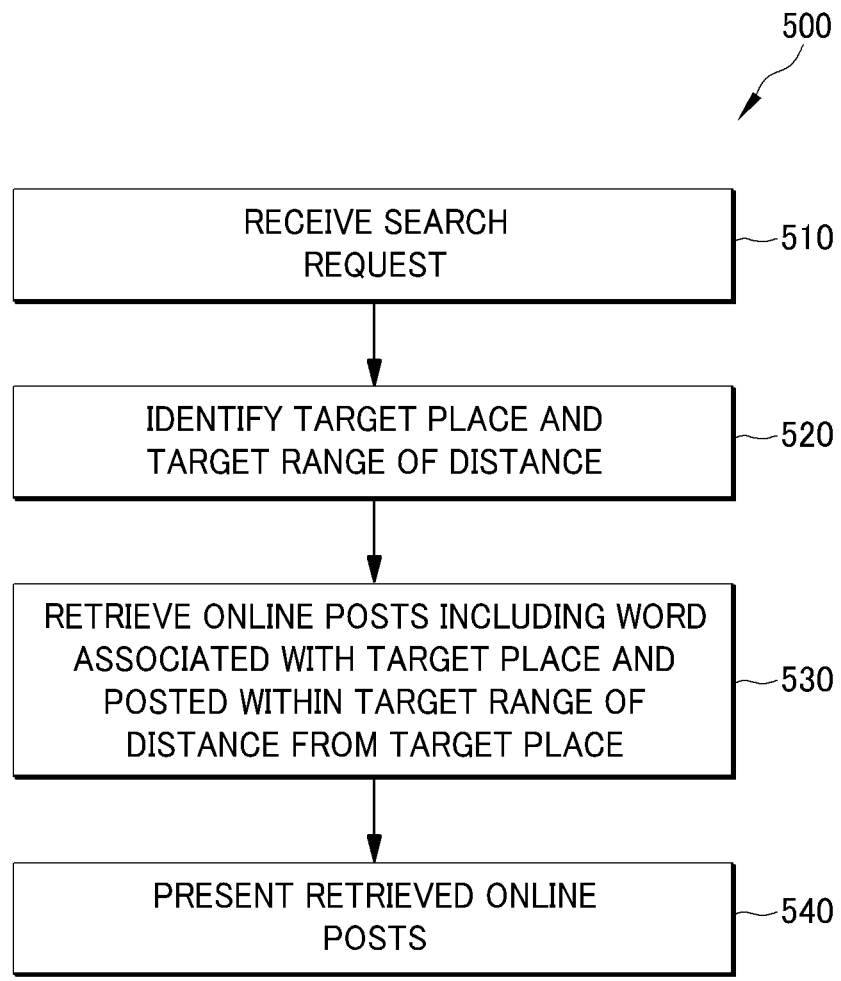
FIG. 5 shows another example flow diagram of a process for providing a search result in response to a search request for one or more online posts, arranged in accordance with at least some embodiments described herein.

FIG. 5 shows another example flow diagram of a process for providing a search result in response to a search request for one or more online posts, arranged in accordance with at least some embodiments described herein.

The process in FIG. 5 may be implemented in a server, such as server 100 including online post analysis unit 110, location identifying unit 120, reliability determination unit 130, online post presenting unit 140, search request analysis unit 150 and retrieving unit 160 described above. An example process 500 may include one or more operations, actions, or functions as illustrated by one or more blocks 510, 520, 530 and/or 540. Although illustrated as discrete blocks, various blocks may be divided into additional blocks, combined into fewer blocks, or eliminated, depending on the desired implementation. Processing may begin at block 510.

At block 510 (Receive Search Request), server 100 may receive from a device a search request including a search query. Processing may continue from block 510 to block 520.

At block 520 (Identify Target Place and Target Range of Distance), server 100 may identify from the search query a target place and a target range of distance from the target place. Processing may continue from block 520 to block 530.

At block 530 (Retrieve Online Posts Including Word Associated with Target Place and Posted within Target Range of Distance from Target Place), server 100 may retrieve from a database one or more online posts that include at least one word associated with the identified target place, and were posted within the target range of distance from the identified target place. In some embodiments, the database may store the one or more online posts with location information regarding where the respective online posts were posted. Processing may continue from block 530 to block 540.

At block 540 (Present Retrieved Online Posts), server 100 may present the retrieved online posts as a search result to the requesting device. In some embodiments, the server may present the online posts in order of their reliabilities. In some embodiments, the server may block some of the online posts whose reliabilities are lower than a predetermined value.

One skilled in the art will appreciate that, for these and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
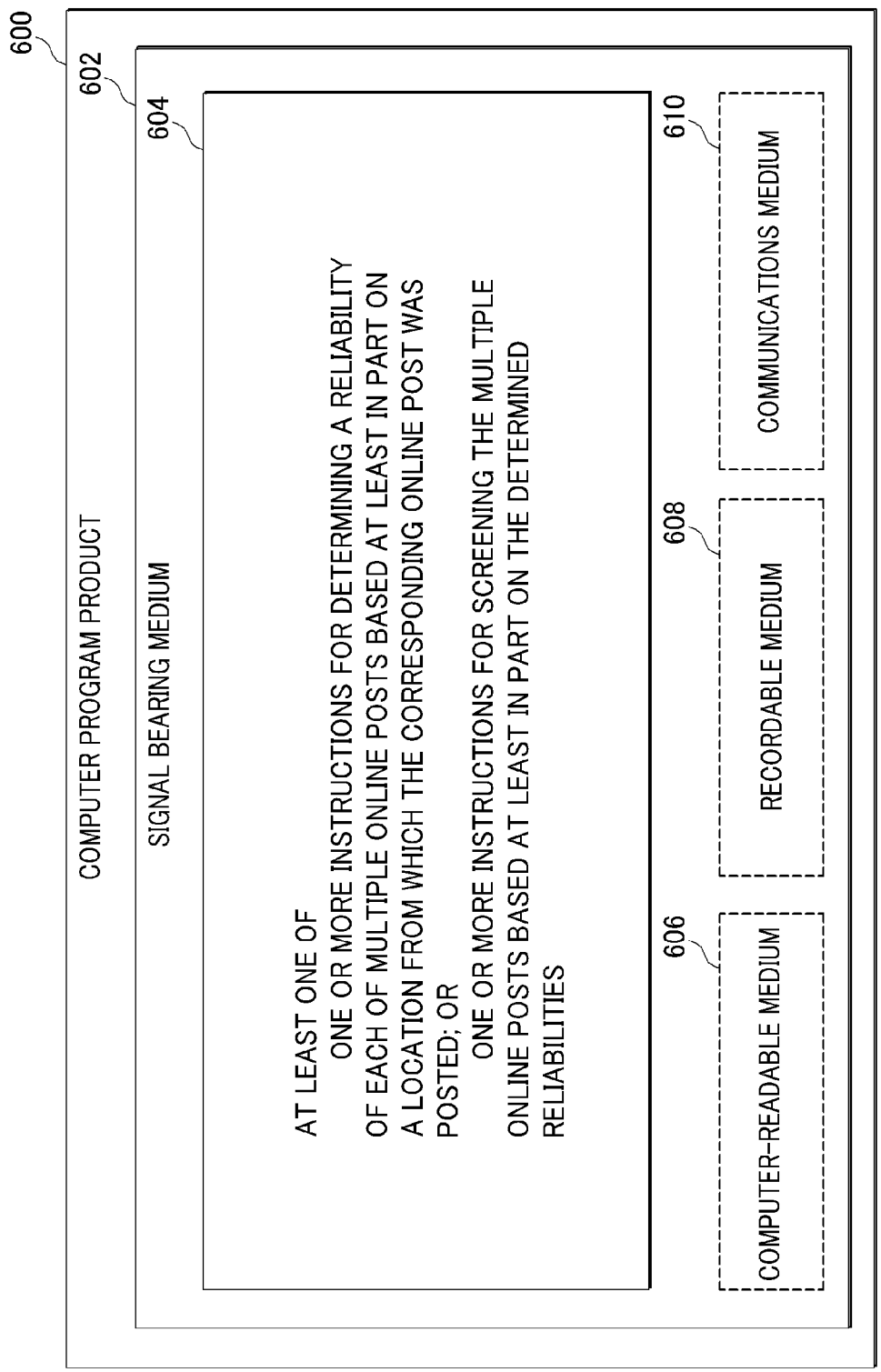
FIG. 6 illustrates an example computer program product that may be utilized to determine a reliability of an online post based at least in part on location information, arranged in accordance with at least some embodiments described herein.

FIG. 6 illustrates an example computer program product that may be utilized to determine a reliability of an online post based at least in part on location information, arranged in accordance with at least some embodiments described herein.

Computer program product 600 may include a signal bearing medium 602. Signal bearing medium 602 may include one or more instructions 604 that, when executed by, for example, a processor, may provide the functionality described above with respect to FIGS. 1-5. By way of example, instructions 604 may include: one or more instructions for determining a reliability of each of multiple online posts based at least in part on a location from which the corresponding online post was posted; one or more instructions for screening the multiple online posts based at least in part on the determined reliabilities. Thus, for example, referring to FIG. 1, server 100 may undertake one or more of the blocks shown in FIG. 3 in response to instructions 604.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to one or more modules of server 100 by an RF signal bearing medium 602, where the signal bearing medium 602 is conveyed by a wireless communications medium 610 (e.g., a wireless communications medium conforming with the IEEE 802.11 standard).

Figure 7:
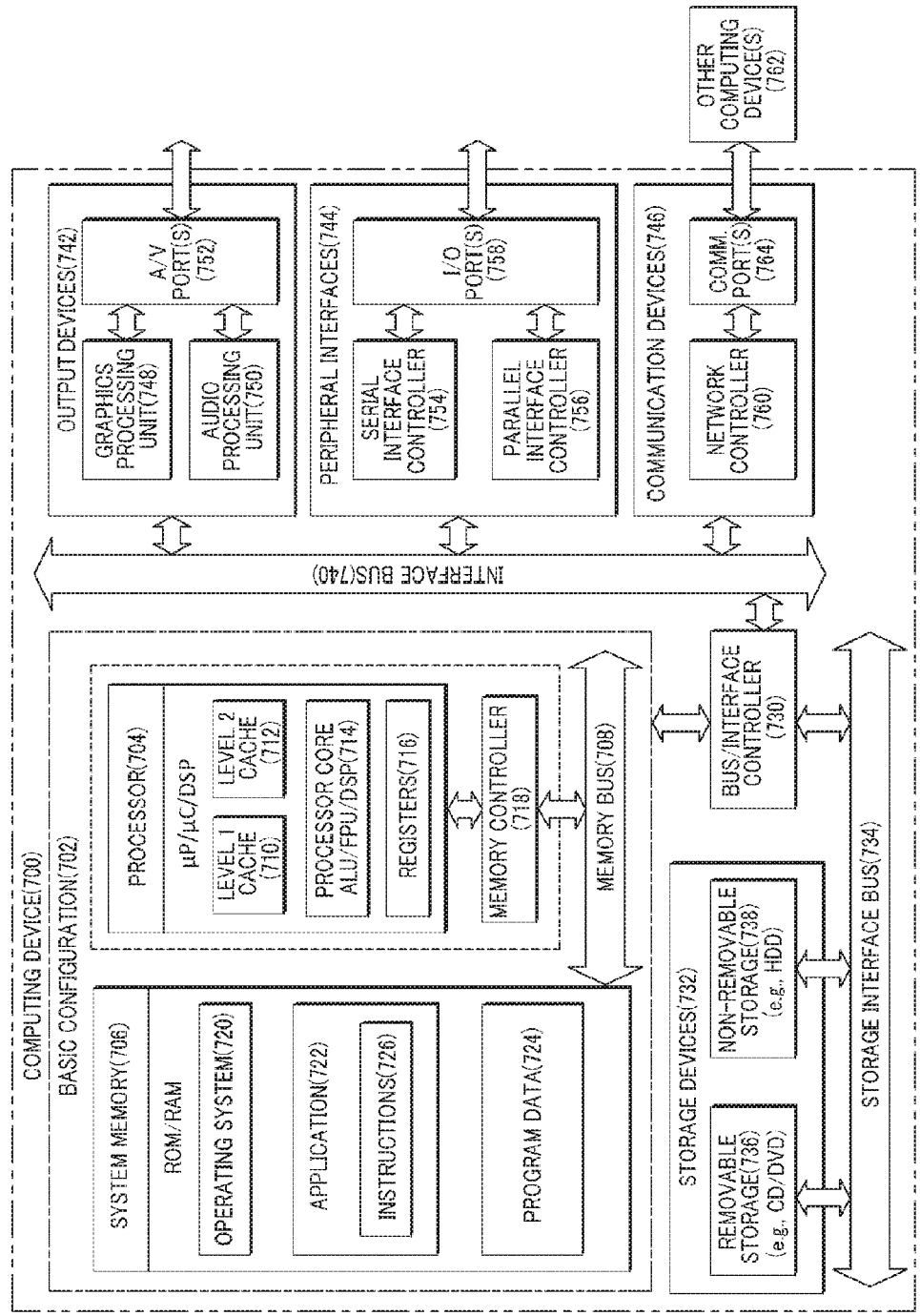
FIG. 7 is a block diagram illustrating an example computing device that may be utilized to determine a reliability of an online post based at least in part on location information and/or provide a search result in response to a search request for one or more online posts, arranged in accordance with at least some embodiments described herein.

FIG. 7 is a block diagram illustrating an example computing device that may be utilized to determine a reliability of an online post based at least in part on location information and/or provide a search result in response to a search request for one or more online posts, arranged in accordance with at least some embodiments described herein.

In these examples, elements of computing device 700 may be arranged or configured for a server. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include instructions 726 that may be arranged to perform the functions as described herein including the actions described with respect to the server 100 architecture as shown in FIG. 1 or including the actions described with respect to the flow charts shown in FIGS. 3-5. In some examples, application 722 may be arranged to operate with program data 724 on an operating system 720 such that implementations for instructions for an electronic device as described herein.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
   receiving a search request for an online post;
   determining, from the search request, a target place and a target range of distance from the target place;
   retrieving one or more online posts that were posted from a posting location within the target range and that include in their content a word associated with the target place;
   identifying respective posting locations from which the one or more retrieved online posts were posted, based at least in part on location information of a device via which each of the one or more retrieved online posts were respectively posted;
   determining respective reliabilities of the one or more retrieved online posts based at least in part on the word associated with the target place and the posting location from which the corresponding retrieved online post was posted, respectively, wherein the respective determined reliabilities decrease as a distance between the target place and the posting location increases;
   presenting, as a response to the search request, the one or more retrieved online posts, excluding retrieved online posts whose respective determined reliabilities are lower than a predetermined value;
   monitoring a variation in an amount of online posts from within the target range of distance from the target place; and
   estimating an incident time and an incident place of an incident occurrence when the amount of online posts posted from within the target range increases suddenly.

2. The method of claim 1, wherein the location information of the device includes GPS (Global Positioning System) information of the device when the one or more retrieved online posts are posted.

3. The method of claim 1, further comprising:
   presenting the one or more retrieved online posts with the respective posting location from which the one or more retrieved online posts were posted.

4. The method of claim 1, further comprising:
   presenting the one or more retrieved online posts with the respective determined reliability of the one or more retrieved online posts.

5. The method of claim 1, wherein the method is implemented in a server.

6. The method of claim 1, wherein the target range is defined by a circle, a polygon or a looped curve on a map.

7. A non-transitory computer-readable storage medium having stored thereon computer-executable instructions that, in response to execution, cause a server to perform operations, comprising:
   determining, from a search request, a target place and a target range of distance from the target place;
   retrieving multiple online posts that were posted from a posting location within the target range and that include in their respective contents a word associated with the target place;
   identifying respective posting locations from which the retrieved multiple online posts were posted based at least in part on location information of a device via which each of the retrieved multiple online posts were posted;
   determining respective reliabilities of the multiple online posts based at least in part on the word associated with the target place and the posting location from which the corresponding retrieved online post was posted, respectively, wherein the respective determined reliabilities increase as a distance between the target place and its posting location decreases;
   screening the retrieved multiple online posts based at least in part on the determined reliabilities, including screening out retrieved online posts having respective determined reliabilities that are lower than a predetermined numeric value;

monitoring a variation in an amount of online posts from within the target range of distance from the target place; and estimating an incident time and an incident place of an incident occurrence when the amount of online posts posted from within the target range increases suddenly.

8. The non-transitory computer-readable storage medium of claim 7, wherein:

identifying of the respective posting location from which each of the multiple online posts was posted is based at least in part on GPS (Global Positioning System) information of a device via which the corresponding online post was posted at the time the corresponding online post was posted.

9. The non-transitory computer-readable storage medium of claim 7, wherein the operations further comprise:

sorting the multiple online posts in order of the determined reliabilities.

10. The non-transitory computer-readable storage medium of claim 7, wherein the operations further comprise:

presenting the retrieved multiple online posts with the respective locations from which the respective retrieved online posts were posted.

11. The non-transitory computer-readable storage medium of claim 7, wherein the operations further comprise:

presenting the retrieved multiple online posts with the respective determined reliabilities.

12. The non-transitory computer-readable storage medium of claim 7, wherein the target range is defined by a circle, a polygon or a looped curve on a map.

13. An apparatus, comprising:

a receiver configured to receive a search request for an online post; and a processor configured to:

determine, from the search request, a target place and a target range of distance from the target place, retrieve one or more online posts that were posted from a posting location within the target range and that include in their content a word associated with the target place, identify respective posting locations from which the one or more retrieved online posts were posted, based at least in part on location information of a device via which each of the one or more retrieved online posts were respectively posted, determine respective reliabilities of the one or more retrieved online posts based at least in part on the word associated with the target place and the posting location from which the corresponding retrieved online post was posted, respectively, wherein the respective determined reliabilities decrease as a distance between the target place and the posting location increases, present, as a response to the search request, the one or more retrieved online posts, excluding retrieved online posts whose respective determined reliabilities are lower than a predetermined value;

monitor a variation in an amount of online posts from within the target range of distance from the target place, and estimate an incident time and an incident place of an incident occurrence when the amount of online posts from within the target range increases suddenly.

14. The apparatus of claim 13, wherein the target range is defined by a circle, a polygon or a looped curve on a map.

* * * * *